United States Patent
Hosaka et al.

(10) Patent No.: US 8,226,298 B2
(45) Date of Patent: Jul. 24, 2012

(54) SEALING DEVICE AND ROLLING BEARING APPARATUS

(75) Inventors: Ryouhei Hosaka, Kashiwara (JP); Kunio Higuchi, Kashiba (JP); Masahide Sunagawa, Tokushima (JP)

(73) Assignee: JTEKT Corporation, Osaka-Shi, Osaka (JP)

(*) Notice: Subject to any disclaimer, the term of this patent is extended or adjusted under 35 U.S.C. 154(b) by 511 days.

(21) Appl. No.: 12/311,689

(22) PCT Filed: Oct. 23, 2007

(86) PCT No.: PCT/JP2007/070637
§ 371 (c)(1),
(2), (4) Date: Apr. 9, 2009

(87) PCT Pub. No.: WO2008/050759
PCT Pub. Date: May 2, 2008

(65) Prior Publication Data
US 2009/0257699 A1   Oct. 15, 2009

(30) Foreign Application Priority Data
Oct. 24, 2006  (JP) .................................. 2006-288999

(51) Int. Cl.
*F16C 33/76* (2006.01)
(52) U.S. Cl. ........................................ 384/477; 384/484
(58) Field of Classification Search .................. 384/477, 384/484, 486
See application file for complete search history.

(56) References Cited

U.S. PATENT DOCUMENTS

| | | | | |
|---|---|---|---|---|
| 4,692,040 A | * | 9/1987 | Ebaugh et al. | 384/484 |
| 4,848,776 A | * | 7/1989 | Winckler | 277/349 |
| 4,997,294 A | * | 3/1991 | Hillmann | 384/484 |
| 5,118,206 A | * | 6/1992 | Otto et al. | 384/477 |
| 5,213,342 A | * | 5/1993 | Weber | 277/644 |
| 5,503,480 A | * | 4/1996 | Caillaut et al. | 384/477 |
| 5,509,667 A | * | 4/1996 | Klein et al. | 277/565 |
| 6,241,396 B1 | * | 6/2001 | Shimomura et al. | 384/477 |
| 6,457,870 B2 | * | 10/2002 | Aizawa et al. | 384/477 |

FOREIGN PATENT DOCUMENTS

| | | |
|---|---|---|
| JP | 55-40305 | 3/1980 |
| JP | 55-47017 | 4/1980 |
| JP | 62-158216 | 10/1987 |
| JP | 6-17824 | 1/1994 |
| JP | 9-329243 | 12/1997 |
| JP | 11-254010 | 9/1999 |
| JP | 2002-178013 | 6/2002 |
| JP | 54-69639 | 6/2009 |

* cited by examiner

*Primary Examiner* — William C Joyce
(74) *Attorney, Agent, or Firm* — McGinn IP Law Group PLLC

(57) ABSTRACT

This sealing device has an annular metal core portion and an annular elastic portion. The elastic portion has a thick portion and a thin portion which extends from the thick portion in an axial direction of the elastic portion and has a thinner thickness in a radial direction than the thick portion. A fixed lip is provided on an inner peripheral surface of the thick portion, and a sliding lip is provided on an inner peripheral surface of the thin portion.

2 Claims, 4 Drawing Sheets

SEALING DEVICE AND ROLLING BEARING APPARATUS

TECHNICAL FIELD

The present invention relates to a sealing device and a rolling bearing apparatus, and more particularly to a sealing device and a rolling bearing apparatus which are suitably used in a work roll of a rolling mill.

BACKGROUND ART

Conventionally, as a sealing device, one described in JP-A-2002-178013 (patent document 1) is known.

This sealing device is disposed in a roll neck supporting bearing of a work roll of a rolling mill. Specifically, this bearing has an inner ring, an outer ring, and tapered rollers, and the inner ring has a first inner ring and a second inner ring. An axial end surface of the first inner ring and an axial end surface of the second inner ring are abutted against each other in the axial direction. An annular groove is provided on outer peripheral surfaces of the axially abutted portions of the inner ring.

This sealing device is disposed in the annular groove. This sealing device is comprised of an annular metal core portion extending in an axial direction of the inner ring and an elastic portion fixed to this metal core portion. The elastic portion has a first seal lip which is in contact with an outer peripheral surface of the first inner ring and a second seal lip which is in contact with an outer peripheral surface of the second inner ring. Further, the sealing device has a third seal lip which is in contact with an axial end surface of the first inner ring and a fourth seal lip which is contact with an axial end surface of the second inner ring.

This sealing device prevents the entry into the interior of the bearing of cooling water and rolling oil which enters the annular groove after passing from the roll neck side between the abutted first and second inner rings.

Patent document 1: JP-A-2002-178013 (FIG. 1)

DISCLOSURE OF THE INVENTION

Problems that the Invention is to Solve

The present inventor found out that in a case where the diametric dimension of the work roll is very large and the diametric dimension of the inner ring is very large, unlike the case where the diametric dimension of the inner ring is small, the wear of the first to fourth seal lips of the sealing device of the above-described configuration becomes large, so that the service life of the bearing unavoidably becomes short.

This is conceivably attributable to the following reason. Namely, in the work roll, nonuniform forces are frequently applied in the axial direction of the work roll owing to the passage of a rolled material, and a difference in the peripheral speed can be produced between the first inner ring and the second inner ring, so that there are cases where the second inner ring rotates relative to the first inner ring. Here, in a case where the diametric dimension of the aforementioned work roll is very large and the diametric dimension of the inner ring is very large, the straining force of seal lips is large, so that the twisting of the seal lips becomes large. For this reason, it is thought that the wear of the seal lips becomes large.

Accordingly, an object of the invention is to provide a sealing device in which, even if the second inner ring rotates relative to the first inner ring abutted against it in the axial direction, the wear of the lips is small, and the service life is long. In addition, another object of the invention is to provide a rolling bearing apparatus in which the service life of the sealing device is prolonged.

Means for Solving the Problem

To overcome this problem, a sealing device in accordance with the invention comprises:

an annular elastic portion, wherein the elastic portion includes a thick portion and a thin portion which extends from the thick portion in an axial direction of the elastic portion and has a thinner thickness in a radial direction than the thick portion, and wherein a fixed lip is provided on an inner peripheral surface of the thick portion, and a sliding lip is provided on an inner peripheral surface of the thin portion.

In accordance with the invention, since the fixed lip and the sliding lip are provided on the inner peripheral surface of the elastic portion, the fixed lip can be brought into contact with the outer peripheral surface of one annular member between two annular members having the following configuration, i.e., two annular members whose respective axial end surfaces are abutted against each other and between which one annular member is rotatable relative to the other annular member, while the sliding lip can be brought into contact with the outer peripheral surface of the other annular member. Namely, the fixed lip can be substantially fixed to the one annular member, and the sliding lip can be slid with respect to the other annular member. Accordingly, since excessive circumferential twisting does not occur in the fixed lip and the sliding lip, it is possible to suppress the wear of the fixed lip and the sliding lip, thereby making it possible to prolong the service life of the sealing device.

In addition, the sealing device in accordance with the invention comprises:

an annular elastic portion, wherein the elastic portion includes a thick portion and a thin portion which extends from the thick portion in an axial direction of the elastic portion and has a thinner thickness in a radial direction than the thick portion, and wherein a fixed lip is provided on an outer peripheral surface of the thick portion, and a sliding lip is provided on an outer peripheral surface of the thin portion.

In accordance with the invention, since the fixed lip and the sliding lip are provided on the outer peripheral surface of the elastic portion, the fixed lip can be brought into contact with the inner peripheral surface of one annular member between two annular members having the following configuration, i.e., two annular members whose respective axial end surfaces are abutted against each other and between which one annular member is rotatable relative to the other annular member, while the sliding lip can be brought into contact with the inner peripheral surface of the other annular member. Namely, the fixed lip can be substantially fixed to the one annular member, and the sliding lip can be slid with respect to the other annular member. Accordingly, since excessive circumferential twisting does not occur in the fixed lip and the sliding lip, it is possible to suppress the wear of the fixed lip and the sliding lip, thereby making it possible to prolong the service life of the sealing device.

In addition, the sealing device in accordance with one embodiment further comprises: an annular metal core portion, wherein the elastic portion is secured to the metal core portion, and the elastic portion includes an end surface on an opposite side in the axial direction to a thick portion side of the sliding lip and on an outer side in the radial direction of the thin portion, and includes a projecting portion projecting from the end surface in the axial direction.

According to the above-described embodiment, the elastic portion has an end surface in the axial direction on an opposite side in the axial direction to the thick portion side of the sliding lip and on the an outer side in the radial direction of the thin portion, and has a projecting portion projecting from the end surface in the axial direction. Hence, a pace is formed at a position where the projecting portion is not present and at the same circumferential position as the projecting portion. Therefore, it is possible to supply a lubricant to the end surface on the one axial side of the sliding lip through this space, so that it is possible to lubricate the sliding lip. Accordingly, it is possible to further suppress the wear of the sliding lip, and it is possible to further prolong the service life of the sealing device in comparison with the configuration in which only a fixed lip is provided.

In addition, a rolling bearing apparatus in accordance with the invention comprises:

an outer ring;

an inner ring; and rolling elements arranged between the outer ring and the inner ring, wherein the inner ring has a first inner ring and a second inner ring which are abutted against each other in an axial direction of the inner ring, wherein an annular groove is formed on outer peripheral surfaces of axially abutted portions of the inner ring, wherein a sealing device is fitted in the annular groove, the sealing device having an annular elastic portion which includes a thick portion and a thin portion extending from the thick portion in an axial direction of the elastic portion and having a thinner thickness in a radial direction than the thick portion, a fixed lip being provided on an inner peripheral surface of the thick portion, a sliding lip being provided on an inner peripheral surface of the thin portion, and wherein the fixed lip of the sealing device is in contact with an outer peripheral surface of the first inner ring constituting a portion of a bottom surface of the annular groove, while the sliding lip of the sealing device is in contact with an outer peripheral surface of the second inner ring constituting a portion of the bottom surface of the annular groove.

The above-described phrase "a first inner ring and a second inner ring which are abutted against each other in an axial direction of the inner ring" shall be construed to, of course, refer to mutually contiguous portions of the first inner ring and the second inner ring in a state in which the first inner ring and the second inner ring are abutted against each other in the axial direction, and this phrase "a first inner ring and a second inner ring which are abutted against each other in an axial direction of the inner ring" shall also be construed to refer to mutually contiguous portions of the first inner ring and the second inner ring in a state in which the first inner ring and the second inner ring are opposed to each other in non-contact in the axial direction through an axial gap therebetween.

According to the invention, the fixed lip of the above-described sealing device is in contact with the outer peripheral surface of the first inner ring which constitutes a portion of the bottom surface of the annular groove, while the sliding lip of the above-described sealing device is in contact with the outer peripheral surface of the second inner ring which constitutes a portion of the bottom surface of the annular groove. Hence, even if the second inner ring has rotated with respect to the first inner ring, the sliding lip formed on the thin portion slides with respect to the second inner ring, so that the fixed lip and the sliding lip are not excessively twisted in the circumferential direction. Accordingly, it is possible to suppress the wear of the fixed lip and the sliding lip, and it is possible to prolong the service life of the sealing device in comparison with the sealing device which has only the fixed lip.

In addition, a rolling bearing apparatus in accordance with the invention comprises:

an outer ring;

an inner ring; and rolling elements arranged between the outer ring and the inner ring, wherein the inner ring has a first inner ring and a second inner ring which are abutted against each other in an axial direction of the inner ring, wherein an annular groove is formed on inner peripheral surfaces of axially abutted portions of the inner ring, wherein a sealing device is fitted in the annular groove, the sealing device having an annular elastic portion which includes a thick portion and a thin portion extending from the thick portion in an axial direction of the elastic portion and having a thinner thickness in a radial direction than the thick portion, a fixed lip being provided on an outer peripheral surface of the thick portion, a sliding lip being provided on an outer peripheral surface of the thin portion, and wherein the fixed lip of the sealing device is in contact with an inner peripheral surface of the first inner ring constituting a portion of a bottom surface of the annular groove, while the sliding lip of the sealing device is in contact with an inner peripheral surface of the second inner ring constituting a portion of the bottom surface of the annular groove.

The above-described phrase "a first inner ring and a second inner ring which are abutted against each other in an axial direction of the inner ring" shall be construed to, of course, refer to mutually contiguous portions of the first inner ring and the second inner ring in a state in which the first inner ring and the second inner ring are abutted against each other in the axial direction, and this phrase "a first inner ring and a second inner ring which are abutted against each other in an axial direction of the inner ring" shall also be construed to refer to mutually contiguous portions of the first inner ring and the second inner ring in a state in which the first inner ring and the second inner ring are opposed to each other in non-contact in the axial direction through an axial gap therebetween.

According to the invention, the fixed lip of the above-described sealing device is in contact with the inner peripheral surface of the first inner ring which constitutes a portion of the bottom surface of the annular groove, while the sliding lip of the above-described sealing device is in contact with the inner peripheral surface of the second inner ring which constitutes a portion of the bottom surface of the annular groove. Hence, even if the second inner ring has rotated with respect to the first inner ring, the sliding lip formed on the thin portion slides with respect to the second inner ring, so that the fixed lip and the sliding lip are not excessively twisted in the circumferential direction. Accordingly, it is possible to suppress the wear of the fixed lip and the sliding lip, and it is possible to prolong the service life of the sealing device in comparison with the sealing device which has only the fixed lip.

Advantages of the Invention

According to the sealing device in accordance with the invention, since the fixed lip and the sliding lip are provided on the inner peripheral surface (or the outer peripheral surface) of the annular elastic portion, the fixed lip can be brought into contact with the outer peripheral surface (or the inner peripheral surface) of one inner ring between two annular members having the following configuration, i.e., two annular members whose respective axial end surfaces are abutted against each other and between which one annular member rotates relative to the other annular member, while the sliding lip can be brought into contact with the outer peripheral surface (or the inner peripheral surface) of the other annular member. Namely, the fixed lip can be substantially fixed to the one annular member, and the sliding lip can be slid with respect to the other annular member. Accordingly, excessive circumferential twisting does not occur in the fixed lip and the sliding lip, and therefore it is possible to suppress the wear of the fixed lip and the sliding lip, thereby making it possible to prolong the service life of the sealing device.

In addition, according to the rolling bearing apparatus in accordance with the invention, the fixed lip of the sealing device is in contact with the outer peripheral surface (or the inner peripheral surface) of the first inner ring which constitutes a portion of the bottom surface of the annular groove, while the sliding lip of the sealing device is in contact with the outer peripheral surface (or the inner peripheral surface) of the second inner ring which constitutes a portion of the bottom surface of the annular groove. Hence, even if the second inner ring has rotated with respect to the first inner ring, the sliding lip formed on the thin portion slides with respect to the second inner ring, so that the fixed lip and the sliding lip are not excessively twisted in the circumferential direction. Accordingly, it is possible to suppress the wear of the fixed lip and the sliding lip, and it is possible to prolong the service life of the sealing device in comparison with the sealing device which has only the fixed lip.

Figure 1:
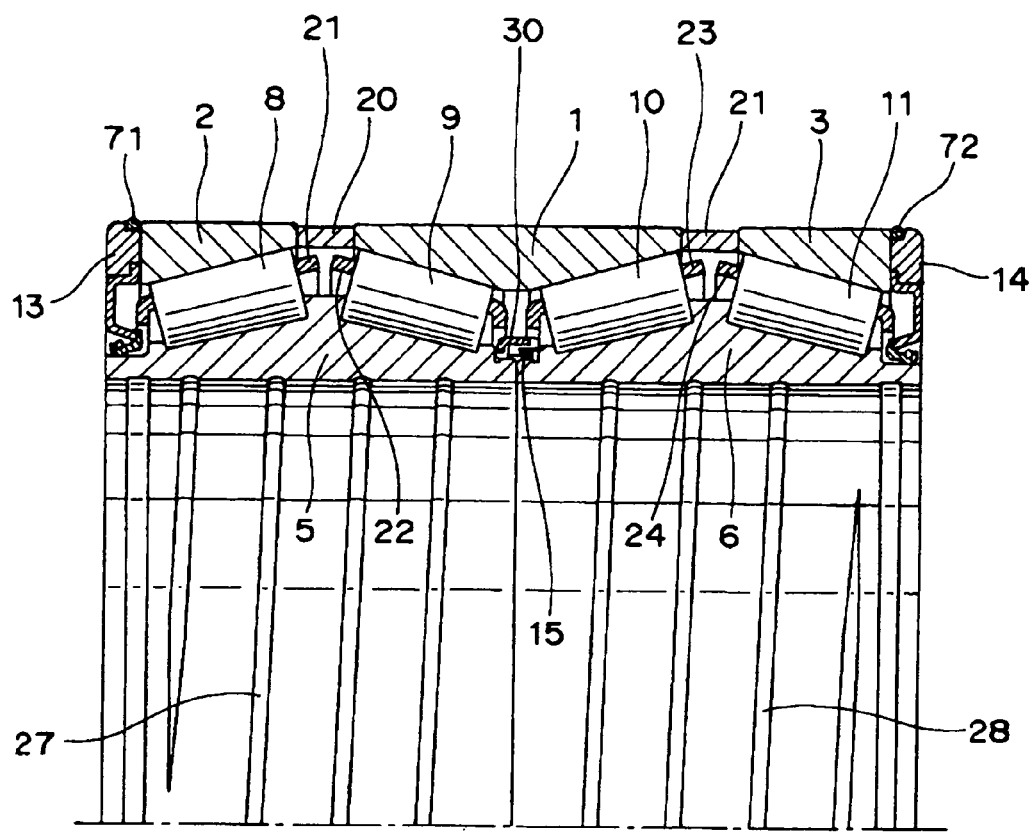
FIG. 1 is an axial cross-sectional view of a rolling bearing apparatus in accordance with a first embodiment of the invention.

1: first outer ring
2: second outer ring
3: third outer ring
5, 105: first inner ring
6, 106: second inner ring
8, 9, 10, 11: tapered rollers
15, 105: third sealing device
30, 130: annular groove
40, 140: metal core portion
41, 141: elastic portion
50, 150: thick portion,
51, 151: thin portion
53, 153: first fixed lip
54, 154: second fixed lip
55, 155: sliding lip
60, 160: end surface
61: projecting portion

BEST MODE FOR CARRYING OUT THE INVENTION

Hereafter, a more detailed description will be given of the invention by illustrated embodiments.

FIG. 1 is an axial cross-sectional view of a rolling bearing apparatus in accordance with a first embodiment of the invention.

This rolling bearing apparatus is disposed on a roll neck of a work roll of a rolling mill.

This rolling bearing apparatus has a first outer ring 1, a second outer ring 2, a third outer ring 3, a first inner ring 5, a second inner ring 6, first tapered rollers 8, second tapered rollers 9, third tapered rollers 10, fourth tapered rollers 11, a first sealing device 13, a second sealing device 14, and a third sealing device 15 in accordance with the first embodiment of the sealing device of the invention.

The aforementioned first outer ring 1 has two tapered raceway surfaces which are axially adjacent to each other, while each of the second outer ring 2 and the third outer ring 3 has one tapered raceway surface. In addition, an outer ring spacer 20 is disposed in an axial gap between the first outer ring 1 and the second outer ring 2, while an outer ring spacer 21 is disposed in an axial gap between the first outer ring 1 and the third outer ring 3. The aforementioned first to third outer rings 1, 2, and 3 are clearance fitted to an inner peripheral surface of a housing (not shown).

Meanwhile, each of the aforementioned first inner ring 5 and second inner ring 6 has two tapered raceway surfaces which are axially adjacent to each other. The first inner ring 5 and the second inner ring 6 are axially matched and are axially abutted against each other. An annular groove 30, which spans between the first inner ring 5 and the second inner ring 6, is formed on outer peripheral surfaces of the abutted portions of the first inner ring 5 and the second inner ring 6. Grooves 27 are formed on an inner peripheral surface of the first inner ring 5, and grooves 28 are formed on an inner peripheral surface of the second inner ring 6. As a lubricant is accommodated in these grooves 27 and 28, the seizure of the inner peripheral surfaces of the first inner ring 5 and the second inner ring 6 is prevented.

The aforementioned first tapered rollers 8 are arranged in such a manner as to be spaced apart at predetermined intervals in the circumferential direction in a state of being retained between the tapered raceway surface of the second inner ring 2 and one tapered raceway surface of the first inner ring 5 by a retainer 21. The aforementioned second tapered rollers 9 are arranged in such a manner as to be spaced apart at predetermined intervals in the circumferential direction in a state of being retained between one tapered raceway surface of the first outer ring 1 and the other tapered raceway surface of the first inner ring 5 by a retainer 22. The aforementioned third tapered rollers 10 are arranged in such a manner as to be spaced apart at predetermined intervals in the circumferential direction in a state of being retained between the other tapered raceway surface of the first outer ring 1 and one tapered raceway surface of the second inner ring 6 by a retainer 23. The aforementioned fourth tapered rollers 11 are arranged in such a manner as to be spaced apart at predetermined intervals in the circumferential direction in a state of being retained between the tapered raceway surface of the third outer ring 3 and the other tapered raceway surface of the second inner ring 6 by a retainer 24.

The aforementioned first sealing device 13 is disposed on an end portion on one axial side of the rolling bearing apparatus. The first sealing device 13 seals an opening on the aforementioned one axial side between the second outer ring 2 and the first inner ring 5. The aforementioned second sealing device 14 is disposed on an end portion on the other axial side of the rolling bearing apparatus. The second sealing device 14 seals an opening on the aforementioned other axial side between the third outer ring 3 and the second inner ring 6.

In addition, a groove is formed on the outer peripheral side of the aforementioned first sealing device 13, and a first O-ring 71 is disposed therein. Also, a groove is formed on the outer peripheral side of the aforementioned second sealing device 14, and a second O-ring 72 is disposed therein.

Through the above-described configuration, a space sealed from the outside is formed by the unillustrated housing, the first O-ring 71, the first sealing device 13, the first inner ring 5, the third sealing device 15, the second inner ring 6, the second sealing device 14, and the second O-ring 72.

The aforementioned third sealing device 15 is exteriorly fitted and fixed in the aforementioned annular groove 30.

Figure 2:
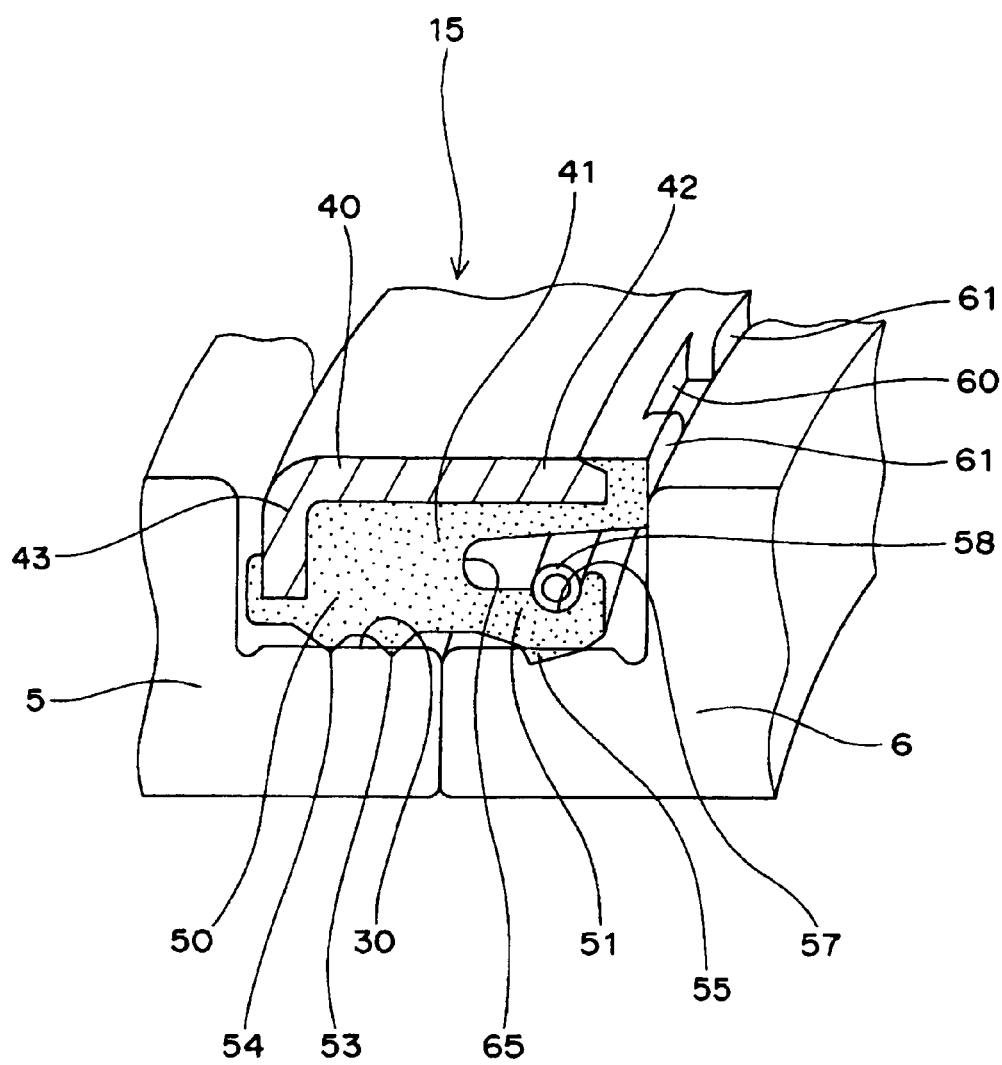
FIG. 2 is a perspective view illustrating an annular groove and its vicinities of the rolling bearing apparatus in accordance with the first embodiment.

FIG. 2 is a diagram illustrating the third sealing device 15 in detail and is a perspective view illustrating the annular groove 30 and its vicinities of the rolling bearing apparatus in accordance with the above-described first embodiment.

The aforementioned third sealing device 15 has an annular metal core portion 40 and an annular elastic portion 41. The metal core portion 40 is formed of a metallic material. The metal core portion 40 is substantially L-shaped in cross section in the axial half cross-sectional view. The metal core portion 40 extends in the axial direction. The metal core portion 40 has a substantially cylindrical portion 42 and a bent portion 43 continuing from the cylindrical portion 42. The bent portion 43 constitutes an axial end portion on the first inner ring 5 side of the metal core portion 40, and is bent radially inward from the axial direction.

Meanwhile, the aforementioned elastic portion 41 is formed of an elastic material. The elastic portion 41 is secured to the metal core portion 40 by baking. The elastic portion 41 is located radially inwardly of an outer peripheral surface of the cylindrical portion 42 of the metal core portion 40. The elastic portion 41 has a thick portion 50 and a thin portion 51. The thin portion 51 extends from the thick portion in the axial direction of the elastic portion 41. The radial thickness of the thin portion 51 is thinner than the thick portion 50.

A first fixed lip 53 and a second fixed lip 54 axially adjacent to the first fixed lip 53 are provided on an inner peripheral surface of the aforementioned thick portion 50, while a sliding lip 55 is provided on an inner peripheral surface of the thin portion 51. The first and second fixed lips 53 and 54 are in contact with an outer peripheral surface of the first inner ring 5 which constitutes a portion of a bottom surface of the annular groove 30, while the sliding lip 55 is in contact with an outer peripheral surface of the second inner ring 6 which constitutes a portion of the bottom surface of the annular groove 30.

Since the first and second fixed lips 53 and 54 are formed on the inner peripheral surface of the thick portion 50, their radial straining force is large, so that the first and second fixed lips 53 and 54 are adapted so as not to relatively move with respect to the first inner ring 5. On the other hand, since the sliding lip 55 is formed on the inner peripheral surface of the thin portion 51 whose rigidity is lower than that of the thick portion 50, its radial straining force is smaller than that of the first and second fixed lips, so that its displacement of radial movement is greater than that of the fixed lips, and the sliding lip 55 is adapted to slide with respect to the second inner ring 6. For this reason, in a case where the second inner ring 6 has rotated with respect to the first inner ring 5, the third sealing device 15 (hereafter simply referred to as the sealing device 15) is adapted to almost not relatively move with respect to the first inner ring 5, but to rotate with respect to the second inner ring 6.

The thin portion 51 and the cylindrical portion 42 of the metal core portion 40 are opposed to each other in the radial direction with an interval therebetween. An annular recessed portion 65 which is open in the axial direction is formed in a radial gap between the thin portion 51 and the cylindrical portion 42. An annular groove 57 is formed on an outer peripheral surface of the thin portion 51. A garter spring (elastic metal ring) 58 is fitted in the annular groove 57. The garter spring 58 plays the role of pressing the thin portion 51 in the radially inward direction.

The aforementioned elastic portion 41 has an axial end surface 60 on the axially opposite side to the thick portion 50 side of the third lip 55 and on the radially outer side of the thin portion 51. In addition, the elastic portion 41 has a plurality of projecting portions 61 projecting from the end surface 60 in the axial direction and provided at predetermined intervals in the circumferential direction. Spaces are formed at positions where the projecting portions 60 are not present and at the same circumferential position as the projecting portions 61.

This sealing device 15 is fitted and fixed to the first inner ring 5 and the second inner ring 6 as follows. Namely, after the thin portion 51 of the sealing device 15 is exteriorly fitted to the outer peripheral surface of the second inner ring 6, the first inner ring 5 is interiorly fitted to the thick portion 50 until the first inner ring 5 and the second inner ring 6 are abutted against each other or disposed with a predetermined axial interval therebetween, whereupon the sealing device 15 is fixed to the annular groove 30. By assembling the sealing device 15 to the first and second inner rings 5 and 6 in this procedure, the inversion of the sliding lip 55 whose strength is weaker than the fixed lips 53 and 54 is adapted to be prevented.

According to the sealing device 15 in accordance with the above-described first embodiment, since the first and second fixed lips 53 and 54 and the sliding lip 55 are provided on the inner peripheral surface of the elastic portion 41, the fixed lips can be brought into contact with the outer peripheral surface of the first inner ring 5 between the first and second inner rings 5 and 6, whose respective axial end surfaces are abutted against each other and between which the first inner ring 5 rotates relative to the second inner ring 6, while the sliding lip can be brought into contact with the outer peripheral surface of the second inner ring 6. Namely, the first and second fixed lips 53 and 54 can be substantially fixed to the first inner ring 5, and the sliding lip 55 can be slid with respect to the second inner ring 6. Accordingly, since excessive circumferential twisting does not occur in the first and second fixed lips 53 and 54 and the sliding lip 55, it is possible to suppress the wear of the first and second fixed lips 53 and 54 and the sliding lip 55, thereby making it possible to prolong the service life of the sealing device 15.

In addition, according to the sealing device 15 in accordance with the above-described first embodiment, the elastic portion 41 has the axial end surface 60 on the axially opposite side to the thick portion 50 side of the sliding lip 55 and on the radially outer side of the thin portion 51, and has the projecting portions 61 projecting from the end surface 60 in the axial direction. Hence, spaces are formed at positions where the projecting portions 61 are not present and at the same circumferential position as the projecting portions 61. Therefore, it is possible to supply a lubricant to the end surface of the sliding lip 55 on the interior side of the rolling bearing apparatus through these spaces, so that it is possible to lubricate the sliding lip 55. Accordingly, it is possible to further suppress the wear of the sliding lip 55, and it is possible to further prolong the service life of the sealing device 15 in comparison with the configuration in which only fixed lips are provided.

In addition, according to the rolling bearing apparatus in accordance with the above-described first embodiment, the first and second fixed lips 53 and 54 of the sealing device 15 are in contact with the outer peripheral surface of the first inner ring 5 which constitutes a portion of the bottom surface of the annular groove 30, while the sliding lip 55 of the sealing device 15 is in contact with the outer peripheral surface of the second inner ring 6 which constitutes a portion of the bottom surface of the annular groove 30. Hence, even if the second inner ring 6 has rotated with respect to the first inner ring 5, the sliding lip 55 formed on the thin portion 51 slides with respect to the second inner ring 6, so that the first and second fixed lips 53 and 54 and the sliding lip 55 are not excessively twisted in the circumferential direction. Accordingly, it is possible to suppress the wear of the first and second fixed lips 53 and 54 and the sliding lip 55, and it is possible to prolong the service life of the sealing device 15 in comparison with the sealing device which has only the fixed lips.

It should be noted that the rolling elements are the tapered rollers 8, 9, 10, and 11 in the rolling bearing apparatus in accordance with the above-described first embodiment. In this invention, however, the rolling elements may be cylindrical rollers or balls, and may be at least two of the tapered rollers, cylindrical rollers, and balls. In addition, although the number of the outer rings 1, 2, 3 is three in the rolling bearing apparatus in accordance with the above-described first embodiment, in this invention, the number of the outer rings may be one, two, or four or more. In short, in the rolling bearing apparatus of this invention, the number of bearing rings, the structure of the bearing ring, the number of rolling elements, and the type of the rolling element are arbitrary insofar as the configuration provided is such that two inner rings are axially abutted against each other, and an annular groove is formed on outer peripheral surfaces of the two abutted inner rings in such a manner as to span the two inner rings.

In addition, although in the sealing device in accordance with the above-described first embodiment the fixed lips are configured by the two seal lips 53 and 54, in this invention, the fixed lips may be configured by one or three or more seal lips.

In addition, although in the sealing device in accordance with the above-described first embodiment the annular groove 57 is formed on the outer peripheral surface of the thin portion 51, and the garter spring (elastic metal ring) 58 is fitted in the annular groove 57, it is possible to adopt a configuration in which the annular groove 57 is not formed on the outer peripheral surface of the thin portion 51, and the garter spring 58 is not present. It goes without saying that, even in such a case, it is possible to obtain an effect similar to that of the sealing device in accordance with the above-described first embodiment if the sliding lip 55 is properly pressed onto the outer peripheral surface of the second inner ring 6.

Figure 3:
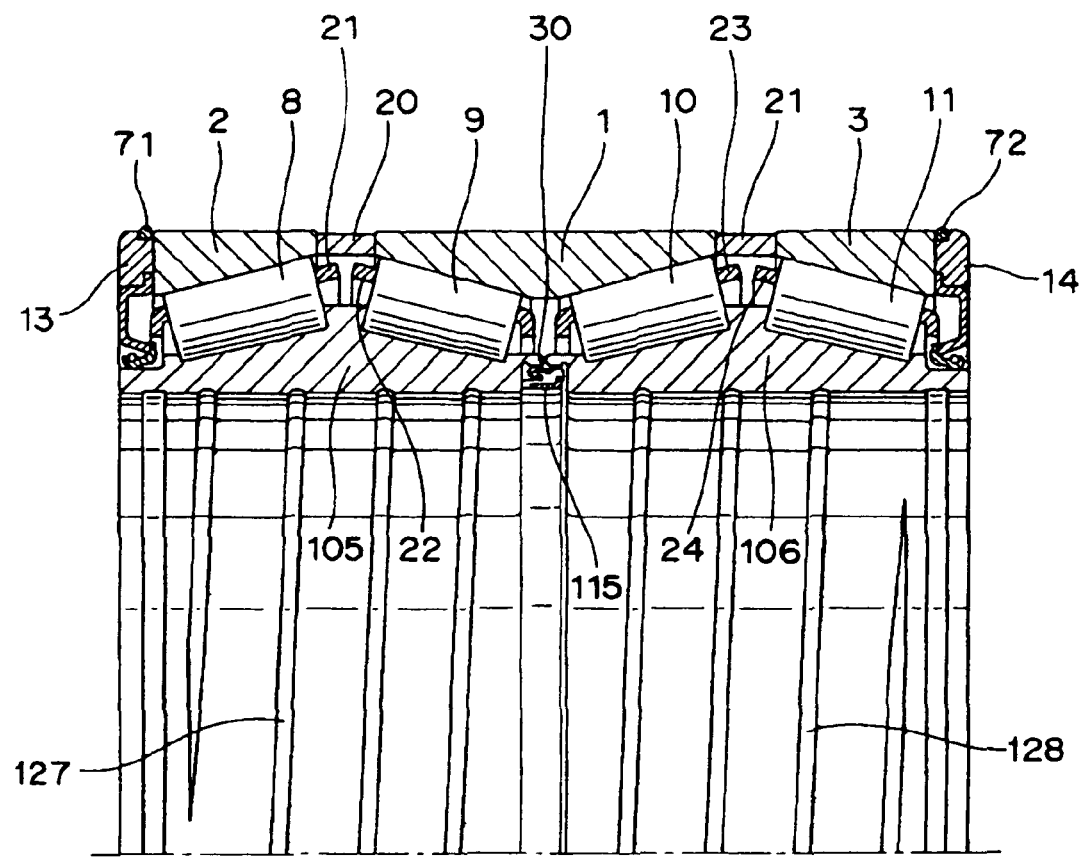
FIG. 3 is an axial cross-sectional view of the rolling bearing apparatus in accordance with a second embodiment of the invention.

FIG. 3 is an axial cross-sectional view of the rolling bearing apparatus in accordance with a second embodiment of the invention.

This rolling bearing apparatus is disposed on a roll neck of a work roll of a rolling mill.

This rolling bearing apparatus has the first outer ring 1, the second outer ring 2, the third outer ring 3, a first inner ring 105, a second inner ring 106, the first tapered rollers 8, the second tapered rollers 9, the third tapered rollers 10, the fourth tapered rollers 11, the first sealing device 13, the second sealing device 14, and a third sealing device 115 in accordance with the second embodiment of the sealing device of the invention.

The aforementioned first outer ring 1 has two tapered raceway surfaces which are axially adjacent to each other, while each of the second outer ring 2 and the third outer ring 3 has one tapered raceway surface. In addition, the outer ring spacer 20 is disposed in the axial gap between the first outer ring 1 and the second outer ring 2, while the outer ring spacer 21 is disposed in the axial gap between the first outer ring 1 and the third outer ring 3. The aforementioned first to third outer rings 1, 2, and 3 are clearance fitted to the inner peripheral surface of the housing (not shown).

Meanwhile, each of the aforementioned first inner ring 105 and second inner ring 106 has two tapered raceway surfaces which are axially adjacent to each other. The first inner ring 105 and the second inner ring 106 are axially matched and are axially abutted against each other. An annular groove 30, which spans between the first inner ring 105 and the second inner ring 106, is formed on inner peripheral surfaces of the abutted portions of the first inner ring 105 and the second inner ring 106. Grooves 127 are formed on an inner peripheral surface of the first inner ring 105, and grooves 128 are formed on an inner peripheral surface of the second inner ring 106. As a lubricant is accommodated in these grooves 127 and 128, the seizure of the inner peripheral surfaces of the first inner ring 105 and the second inner ring 106 is prevented.

The aforementioned first tapered rollers 8 are arranged in such a manner as to be spaced apart at predetermined intervals in the circumferential direction in a state of being retained between the tapered raceway surface of the second outer ring 2 and one tapered raceway surface of the first inner ring 105 by the retainer 21. The aforementioned second tapered rollers 9 are arranged in such a manner as to be spaced apart at predetermined intervals in the circumferential direction in a state of being retained between one tapered raceway surface of the first outer ring 1 and the other tapered raceway surface of the first inner ring 105 by the retainer 22. The aforementioned third tapered rollers 10 are arranged in such a manner as to be spaced apart at predetermined intervals in the circumferential direction in a state of being retained between the other tapered raceway surface of the first outer ring 1 and one tapered raceway surface of the second inner ring 106 by the retainer 23. The aforementioned fourth tapered rollers 11 are arranged in such a manner as to be spaced apart at predetermined intervals in the circumferential direction in a state of being retained between the tapered raceway surface of the third outer ring 3 and the other tapered raceway surface of the second inner ring 106 by the retainer 24.

The aforementioned first sealing device 13 is disposed on an end portion on one axial side of the rolling bearing apparatus. The first sealing device 13 seals an opening on the aforementioned one axial side between the second outer ring 2 and the first inner ring 105. The aforementioned second sealing device 14 is disposed on an end portion on the other axial side of the rolling bearing apparatus. The second sealing device 14 seals an opening on the aforementioned other axial side between the third outer ring 3 and the second inner ring 106.

In addition, a groove is formed on the outer peripheral side of the aforementioned first sealing device 13, and the first O-ring 71 is disposed therein. Also, a groove is formed on the outer peripheral side of the aforementioned second sealing device 14, and the second O-ring 72 is disposed therein.

Through the above-described configuration, a space sealed from the outside is formed by the unillustrated housing, the first O-ring 71, the first sealing device 13, the first inner ring 105, the third sealing device 115, the second inner ring 106, the second sealing device 14, and the second O-ring 72.

The aforementioned third sealing device 115 is interiorly fitted and fixed in the aforementioned annular groove 130.

Figure 4:
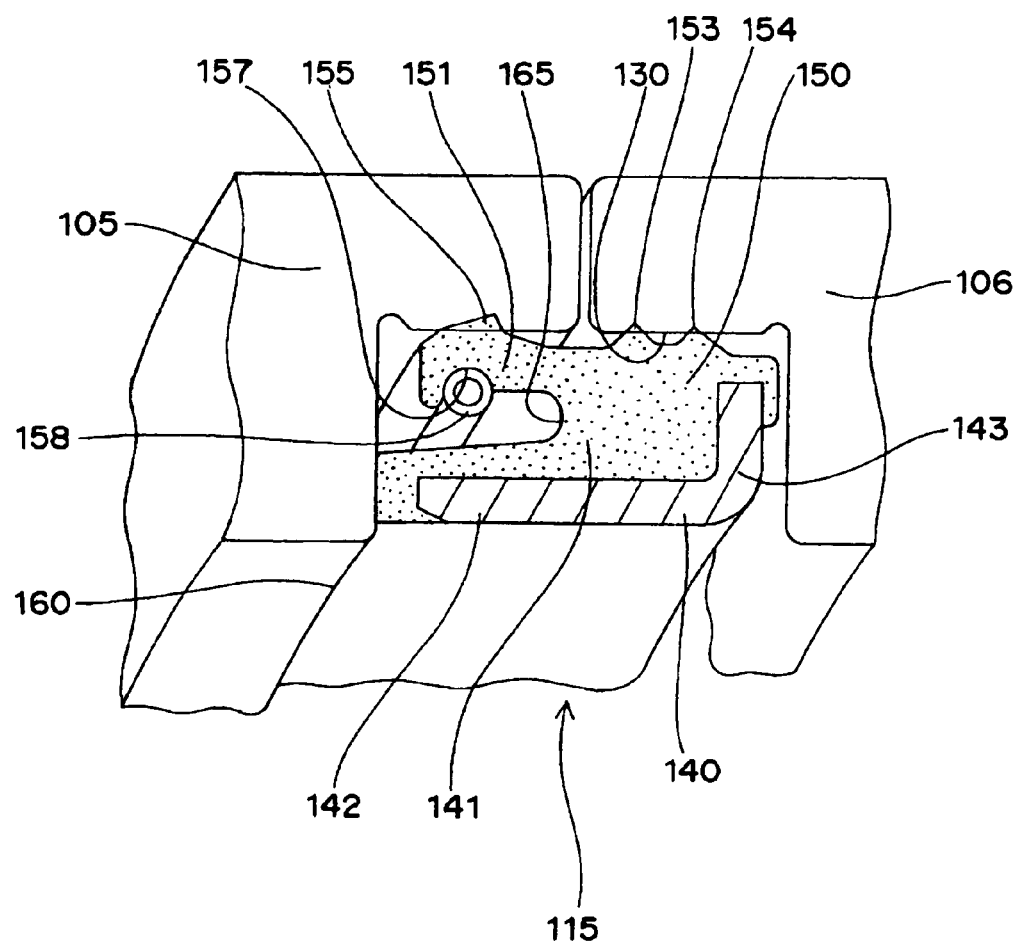
FIG. 4 is a perspective view illustrating the annular groove and its vicinities of the rolling bearing apparatus in accordance with the second embodiment.

FIG. 4 is a diagram illustrating the third sealing device 115 in detail and is a perspective view illustrating the annular groove 130 and its vicinities of the rolling bearing apparatus in accordance with the above-described second embodiment.

The aforementioned third sealing device 115 has an annular metal core portion 140 and an annular elastic portion 141.

The metal core portion 140 is formed of a metallic material. The metal core portion 140 is substantially L-shaped in cross section in the axial half cross-sectional view. The metal core portion 140 extends in the axial direction. The metal core portion 140 has a substantially cylindrical portion 142 and a bent portion 143 continuing from the cylindrical portion 142. The bent portion 143 constitutes an axial end portion on the second inner ring 106 side of the metal core portion 140, and is bent radially outward from the axial direction.

Meanwhile, the aforementioned elastic portion 141 is formed of an elastic material. The elastic portion 141 is secured to the metal core portion 140 by baking. The elastic portion 141 is located radially outwardly of an inner peripheral surface of the cylindrical portion 142 of the metal core portion 140. The elastic portion 141 has a thick portion 150 and a thin portion 151. The thin portion 151 extends from the thick portion 150 in the axial direction of the elastic portion 141. The radial thickness of the thin portion 151 is thinner than the thick portion 150.

A first fixed lip 153 and a second fixed lip 154 axially adjacent to the first fixed lip 153 are provided on an outer peripheral surface of the aforementioned thick portion 150, while a sliding lip 155 is provided on an outer peripheral surface of the thin portion 151. The first and second fixed lips 153 and 154 are in contact with an inner peripheral surface of the second inner ring 106 which constitutes a portion of a bottom surface of the annular groove 130, while the sliding lip 155 is in contact with an inner peripheral surface of the first inner ring 105 which constitutes a portion of the bottom surface of the annular groove 130.

Since the first and second fixed lips 153 and 154 are formed on the outer peripheral surface of the thick portion 150, their radial straining force is large, so that the first and second fixed lips 153 and 154 are adapted so as not to relatively move with respect to the second inner ring 106. On the other hand, since the sliding lip 155 is formed on the outer peripheral surface of the thin portion 151 whose rigidity is lower than that of the thick portion 150, its radial straining force is smaller than that of the first and second fixed lips, so that its displacement of radial movement is greater than that of the fixed lips, and the sliding lip 155 is adapted to slide with respect to the first inner ring 105. For this reason, in a case where the first inner ring 105 has rotated with respect to the second inner ring 106, the third sealing device 115 (hereafter simply referred to as the sealing device 115) is adapted to almost not relatively move with respect to the second inner ring 106, but to rotate with respect to the first inner ring 105.

The thin portion 151 and the cylindrical portion 142 of the metal core portion 140 are opposed to each other in the radial direction with an interval therebetween. An annular recessed portion 165 which is open in the axial direction is formed in a radial gap between the thin portion 151 and the cylindrical portion 142. An annular groove 157 is formed on an inner peripheral surface of the thin portion 151. A garter spring (elastic metal ring) 158 is fitted in the annular groove 157. The garter spring 158 plays the role of pressing the thin portion 151 in the radially outward direction.

The aforementioned elastic portion 141 has an axial end surface 160 on the axially opposite side to the thick portion 150 side of the third lip 155 and on the radially inner side of the thin portion 151.

This sealing device 115 is fitted and fixed to the first inner ring 105 and the second inner ring 106 as follows. Namely, after the thin portion 151 of the sealing device 115 is interiorly fitted to the inner peripheral surface of the first inner ring 105, the second inner ring 106 is exteriorly fitted to the thick portion 150 until the first inner ring 105 and the second inner ring 106 are abutted against each other or disposed with a predetermined axial interval therebetween, whereupon the sealing device 115 is fixed to the annular groove 130. By assembling the sealing device 115 to the first and second inner rings 105 and 106 in this procedure, the inversion of the sliding lip 155 whose strength is weaker than the fixed lips 153 and 154 is adapted to be prevented.

According to the sealing device 115 in accordance with the above-described second embodiment, since the first and second fixed lips 153 and 154 and the sliding lip 155 are provided on the outer peripheral surface of the elastic portion 141, the fixed lips can be brought into contact with the inner peripheral surface of the second inner ring 106 between the first and second inner rings 105 and 106, whose respective axial end surfaces are abutted against each other and between which the first inner ring 105 rotates relative to the second inner ring 106, while the sliding lip can be brought into contact with the inner peripheral surface of the first inner ring 105. Namely, the first and second fixed lips 153 and 154 can be substantially fixed to the second inner ring 106, and the sliding lip 155 can be slid with respect to the first inner ring 105. Accordingly, since excessive circumferential twisting does not occur in the first and second fixed lips 153 and 154 and the sliding lip 155, it is possible to suppress the wear of the first and second fixed lips 153 and 154 and the sliding lip 155, thereby making it possible to prolong the service life of the sealing device 115.

In addition, according to the rolling bearing apparatus in accordance with the above-described second embodiment, the first and second fixed lips 153 and 154 of the sealing device 115 are in contact with the inner peripheral surface of the second inner ring 106 which constitutes a portion of the bottom surface of the annular groove 130, while the sliding lip 155 of the sealing device 115 is in contact with the inner peripheral surface of the first inner ring 105 which constitutes a portion of the bottom surface of the annular groove 130. Hence, even if the first inner ring 105 has rotated with respect to the second inner ring 106, the sliding lip 155 formed on the thin portion 151 slides with respect to the first inner ring 105, so that the first and second fixed lips 153 and 154 and the sliding lip 155 are not excessively twisted in the circumferential direction. Accordingly, it is possible to suppress the wear of the first and second fixed lips 153 and 154 and the sliding lip 155, and it is possible to prolong the service life of the sealing device 115 in comparison with the sealing device which has only the fixed lips.

It should be noted that the rolling elements are the tapered rollers 8, 9, 10, and 11 in the rolling bearing apparatus in accordance with the above-described second embodiment. In this invention, however, the rolling elements may be cylindrical rollers or balls, and may be at least two of the tapered rollers, cylindrical rollers, and balls. In addition, although the number of the outer rings 1, 2, 3 is three in the rolling bearing apparatus in accordance with the above-described second embodiment, in this invention, the number of the outer rings may be one, two, or four or more. In short, in the rolling bearing apparatus of this invention, the number of bearing rings, the structure of the bearing ring, the number of rolling elements, and the type of the rolling element are arbitrary insofar as the configuration provided is such that two inner rings are axially abutted against each other, and an annular groove is formed on inner peripheral surfaces of the two abutted inner rings in such a manner as to span the two inner rings.

In addition, although in the sealing device in accordance with the above-described second embodiment the fixed lips are configured by the two seal lips 53 and 54, in this invention, the fixed lips may be configured by one or three or more seal lips.

In addition, although in the sealing device in accordance with the above-described second embodiment the annular groove 157 is formed on the inner peripheral surface of the thin portion 151, and the garter spring (elastic metal ring) 158 is fitted in the annular groove 157, it is possible to adopt a configuration in which the annular groove 157 is not formed on the inner peripheral surface of the thin portion 151, and the garter spring 158 is not present. It goes without saying that, even in such a case, it is possible to obtain an effect similar to that of the sealing device in accordance with the above-described second embodiment if the sliding lip 155 is properly pressed onto the inner peripheral surface of the first inner ring 105.

The invention claimed is:

1. A rolling bearing apparatus comprising:
   an outer ring;
   an inner ring; and
   rolling elements arranged between the outer ring and the inner ring,
   wherein the inner ring includes a first inner ring and a second inner ring which are abutted against each other in an axial direction of the inner ring,
   wherein an annular groove is formed on outer peripheral surfaces of axially abutted portions of the inner ring,
   wherein a sealing device is fitted in the annular groove, and includes:
      an annular metal core portion; and
      an annular elastic portion secured to the metal core portion, the elastic portion including a thick portion and a thin portion extending from the thick portion in an axial direction of the elastic portion and having a thinner thickness in a radial direction than the thick portion, a fixed lip being provided on an inner peripheral surface of the thick portion, a sliding lip being provided on an inner peripheral surface of the thin portion,
   wherein the fixed lip of the sealing device is in contact with an outer peripheral surface of the first inner ring constituting a portion of a bottom surface of the annular groove, while the sliding lip of the sealing device is in contact with an outer peripheral surface of the second inner ring constituting a portion of the bottom surface of the annular groove such that an annular recessed portion is formed between a portion of the metal core portion and the thin portion,
   wherein the elastic portion includes a projecting portion projecting from an end surface of the elastic portion in the axial direction, and
   wherein the projecting portion contacts a side wall of the annular groove.

2. A rolling bearing apparatus comprising:
   an outer ring;
   an inner ring; and
   rolling elements arranged between the outer ring and the inner ring,
   wherein the inner ring includes a first inner ring and a second inner ring which are abutted against each other in an axial direction of the inner ring,
   wherein an annular groove is formed on outer peripheral surfaces of axially abutted portions of the inner ring,
   wherein a sealing device is fitted in the annular groove, and includes:
      an annular metal core portion; and
      an annular elastic portion secured to the metal core portion, the elastic portion including a thick portion and a thin portion extending from the thick portion in an axial direction of the elastic portion and having a thinner thickness in a radial direction than the thick portion, a fixed lip being provided on an inner peripheral surface of the thick portion, a sliding lip being provided on an inner peripheral surface of the thin portion,
   wherein the fixed lip of the sealing device is in contact with an outer peripheral surface of the first inner ring constituting a portion of a bottom surface of the annular groove, while the sliding lip of the sealing device is in contact with an outer peripheral surface of the second inner ring constituting a portion of the bottom surface of the annular groove such that an annular recessed portion is formed between a portion of the metal core portion and the thin portion,
   wherein the elastic portion includes a projecting portion projecting from an end surface of the elastic portion in the axial direction, and
   wherein the projecting portion comprises a plurality of projecting portions spaced so as to include a gap, in the circumferential direction, between adjacent ones of the plurality of projecting portions.

* * * * *